US011953169B1

(12) United States Patent
Gao et al.

(10) Patent No.: US 11,953,169 B1
(45) Date of Patent: Apr. 9, 2024

(54) IN-SITU REPLACEABLE LED CAR HEADLIGHT AND DESIGN METHOD THEREOF

(71) Applicant: Jiaxing Guangtai Lighting Co., Ltd., Jiaxing (CN)

(72) Inventors: Hui Gao, Jiaxing (CN); Linghui Chen, Jiaxing (CN); Chengjie Zhu, Jiaxing (CN); Lihua Hu, Jiaxing (CN)

(73) Assignee: Jiaxing Guangtai Lighting Co., Ltd., Jiaxing (CN)

( * ) Notice: Subject to any disclaimer, the term of this patent is extended or adjusted under 35 U.S.C. 154(b) by 0 days.

(21) Appl. No.: 18/116,854

(22) Filed: Mar. 3, 2023

(30) Foreign Application Priority Data

Nov. 8, 2022 (CN) ........................ 202211389238.9

(51) Int. Cl.
*F21S 41/19* (2018.01)
*F21S 41/141* (2018.01)
*F21S 45/43* (2018.01)

(52) U.S. Cl.
CPC ........... *F21S 41/192* (2018.01); *F21S 41/141* (2018.01); *F21S 45/43* (2018.01)

(58) Field of Classification Search
CPC .......... F21S 45/42; F21S 45/43; F21S 45/435; F21S 41/141; F21S 41/19; F21S 41/192; F21V 29/67; F21V 29/673; F21V 29/677
See application file for complete search history.

(56) References Cited

U.S. PATENT DOCUMENTS

| | | | | |
|---|---|---|---|---|
| 7,847,471 B2 * | 12/2010 | Liu | F21V 19/0055 313/46 |
| 9,188,322 B2 * | 11/2015 | Lan | F21V 29/00 |
| 10,548,200 B1 * | 1/2020 | Xu | G01K 13/00 |
| 2015/0103552 A1 * | 4/2015 | Aiso | F21S 45/48 362/382 |

* cited by examiner

*Primary Examiner* — Robert J May

(57) ABSTRACT

An in-situ replaceable LED car headlight and a design method, comprising a lamp body shell, a light source assembly provided with LED lamps, a driving assembly, and a fan, wherein the light source assembly is arranged at a head of the lamp body shell, and the driving assembly is arranged at a tail of the lamp body shell; a middle part of the lamp body shell is provided with a central installation part for accommodating the fan, and the fan is installed between the light source assembly and the driving assembly; the driving assembly is electrically connected with the fan by adopting a flexible board connecting wire. A structure in which the fan is arranged in the central position is adopted, so that the fan can be placed in the part with the largest internal space of the lamp body within the range limited by laws and regulations.

8 Claims, 3 Drawing Sheets

IN-SITU REPLACEABLE LED CAR HEADLIGHT AND DESIGN METHOD THEREOF

CROSS-REFERENCE OF THE RELATED APPLICATION

This application is based upon and claims priority to Chinese Patent Application No. 202211389238.9, filed on Nov. 8, 2022, the entire content of which is incorporated herein by reference.

TECHNICAL FIELD

The present invention relates to the technical field of car headlights, in particular to an in-situ replaceable LED car headlight and a design method thereof.

BACKGROUND

On the premise that the photoelectric performance of the existing replaceable LED headlight source is equal to or better than that of the traditional halogen car headlight light source, there are the following problems that cannot fully meet the requirements of the regulatory size: on the one hand, the fans of the existing replaceable LED headlights are mostly placed at the rear of the lamp, which will occupy the position of the rear plug, and the size of the lamp body will exceed the regulatory requirements, which cannot fully meet the regulatory size requirements, and it is impossible to achieve 100% in-situ replacement without modification on some vehicle lamps with fixed sockets; on the other hand, in the existing replaceable LED headlights, the fan is arranged inside the lamp body parallel to the long axis direction of the lamp body (the two axes are perpendicular), resulting in the size of some lamp bodies exceeding the requirements of laws and regulations, and it is impossible to achieve 100% in-situ replacement without modification on some compact vehicle lamps.

SUMMARY

The present invention aims at solving the problems in the prior art, and provides in-situ replaceable LED car headlight and a design method thereof, which can meet the regulatory size requirements and realize 100% in-situ replacement without modification.

In order to achieve the above purpose, the present invention provides an in-situ replaceable LED car headlight, which includes a lamp body shell, a light source assembly provided with LED lamps, a driving assembly and a fan, wherein the light source assembly is arranged at a head of the lamp body shell, and the driving assembly is arranged at a tail of the lamp body shell; a middle part of the lamp body shell is provided with a central installation part for accommodating the fan, and the fan is installed between the light source assembly and the driving assembly.

Preferably, the driving assembly is electrically connected with the light source assembly by a flexible board connecting wire.

Preferably, the flexible board connecting wire is provided with a yielding bend, and the yielding bend spans the fan.

Preferably, the central installation part of the lamp body shell is also provided with a limit slot for accommodating the flexible board connecting wire.

Preferably, the flexible board connecting wire is an FPC connecting wire.

Preferably, an axis of the fan coincides with an axis of the lamp body shell.

Preferably, a fan support frame is also arranged outside the fan.

The present invention further provides a design method of an in-situ replaceable LED car headlight, including the following steps:

- S1, arranging a fan in a lamp body shell, the fan being located between a driving assembly and a light source assembly;
- S2, electrically connecting the driving assembly with the light source assembly by a flexible board connecting wire.

Preferably, the flexible board connecting wire is an FPC connecting wire.

Preferably, an axis of the fan coincides with an axis of the lamp body shell.

The present invention has the beneficial effects that a structure in which the fan is arranged in the central position is adopted, so that the fan can be placed in the part with the largest internal space of the lamp body within the range limited by laws and regulations, and the best heat dissipation performance can be provided on the premise of completely meeting the regulatory size requirements, and the photoelectric performance of the traditional halogen car headlights light source can be achieved or better.

The features and advantages of the present invention will be described in detail by examples with reference to the accompanying drawings.

DETAILED DESCRIPTION OF THE EMBODIMENTS

Figure 1:
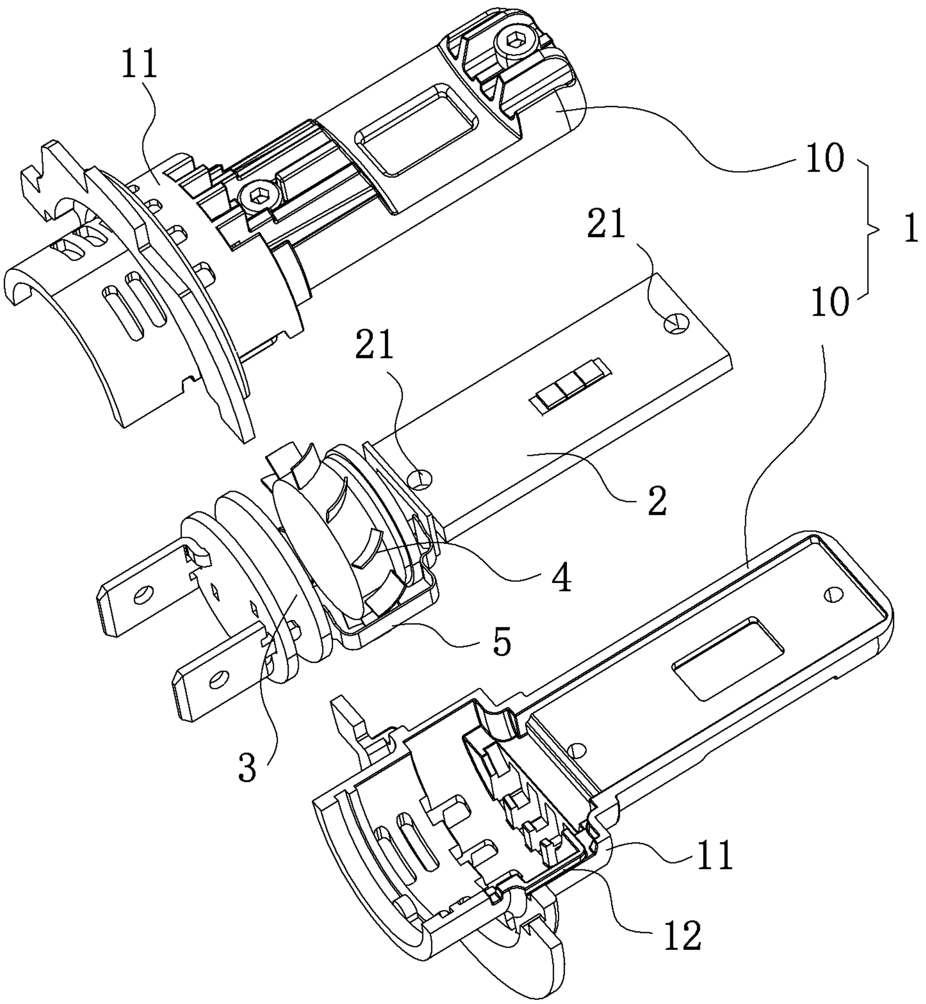
FIG. 1 is an exploded view of Example 1 of an in-situ replaceable LED car headlight in the present invention.

The present invention discloses a design method of an in-situ replaceable LED car headlight, which includes the following steps:

- S1, arranging a fan 4 in a lamp body shell 1, the fan 4 being located between a driving assembly 3 and a light source assembly 2, and the axis of the fan 4 coinciding with the axis of the lamp body shell 1;
- S2. electrically connecting the driving assembly 3 and the light source module 2 by a flexible board connecting wire 5, which is an FPC connecting wire.

Example 1

Referring to FIG. 1, the present invention relates to an in-situ replaceable LED car headlight, which includes a lamp body shell 1, a light source assembly 2 mounted with LED lamps, a driving assembly 3 and a fan 4, wherein the light source assembly 2 is arranged at the head of the lamp body shell 1, and the driving assembly 3 is arranged at the tail of the lamp body shell 1; the middle part of the lamp body shell 1 is provided with a central installation part 11 for accommodating the fan 4; and the fan 4 is installed between the light source assembly 2 and the driving assembly 3. The axis of the fan 4 coincides with the axis of the lamp body shell 1. In this embodiment, the fan 4 adopts a frameless bracket structure fan, which can adapt to the lamp body shell 1 with a small structural size. Setting the fan in the largest part of the internal space of the lamp body within the regulatory scope can provide the best heat dissipation performance on the premise of fully meeting the regulatory size requirements, and can achieve the photoelectric performance equal to or better than that of the traditional halogen car headlights light source.

Further, the driving assembly 3 is electrically connected with the light source assembly 2 by a flexible board connecting wire 5, which is an FPC connecting wire, and FPC has the advantages of ultrathin, reliable conductivity, high structural strength, easy installation, easy welding and the like. Specifically, the flexible board connecting line 5 is provided with a yielding bend, and the yielding bend spans the fan 4. In this embodiment, the flexible board connecting line 5 adopts a U-shaped yielding bend, which can connect the light source assembly 2 and the driving assembly 3 across the fan 4, and at the same time, it must completely meet the size requirements of the regulations. The central installation part 11 of the lamp body shell 1 is also provided with a limit slot 12 for accommodating the flexible board connecting wire 5, which can make the flexible board connecting wire 5 more firmly fixed and prevent interference with the blades of the fan 4.

Further, the lamp body shell 1 includes two half-shell assemblies 10, which are detachably and fixedly connected to and clamp the light source assembly 2, and through slots are formed in the half-shell assemblies 10 corresponding to the LED lamps. In addition, the light source assembly 2 is arranged at the parallel middle cross-sectional position inside the two half-shell assemblies 10; the light source assembly 2 is provided with two mounting holes 21, and the light source assembly 2 is connected and fixed with the lamp body shell 1 through two fastening bolts.

Further, the lamp body shell 1 is provided with a heat dissipation structure, which can improve the heat dissipation effect of the lamp, and the heat dissipation structure comprises a plurality of circumferentially arranged heat dissipation fins and heat dissipation holes. In this embodiment, the heat dissipation fins are arranged at the heads of the central installation part 11 and the lamp body shell 1, and the heat dissipation holes are arranged at the tails of the central installation part 11 and the lamp body shell 1.

Example 2

Figure 2:
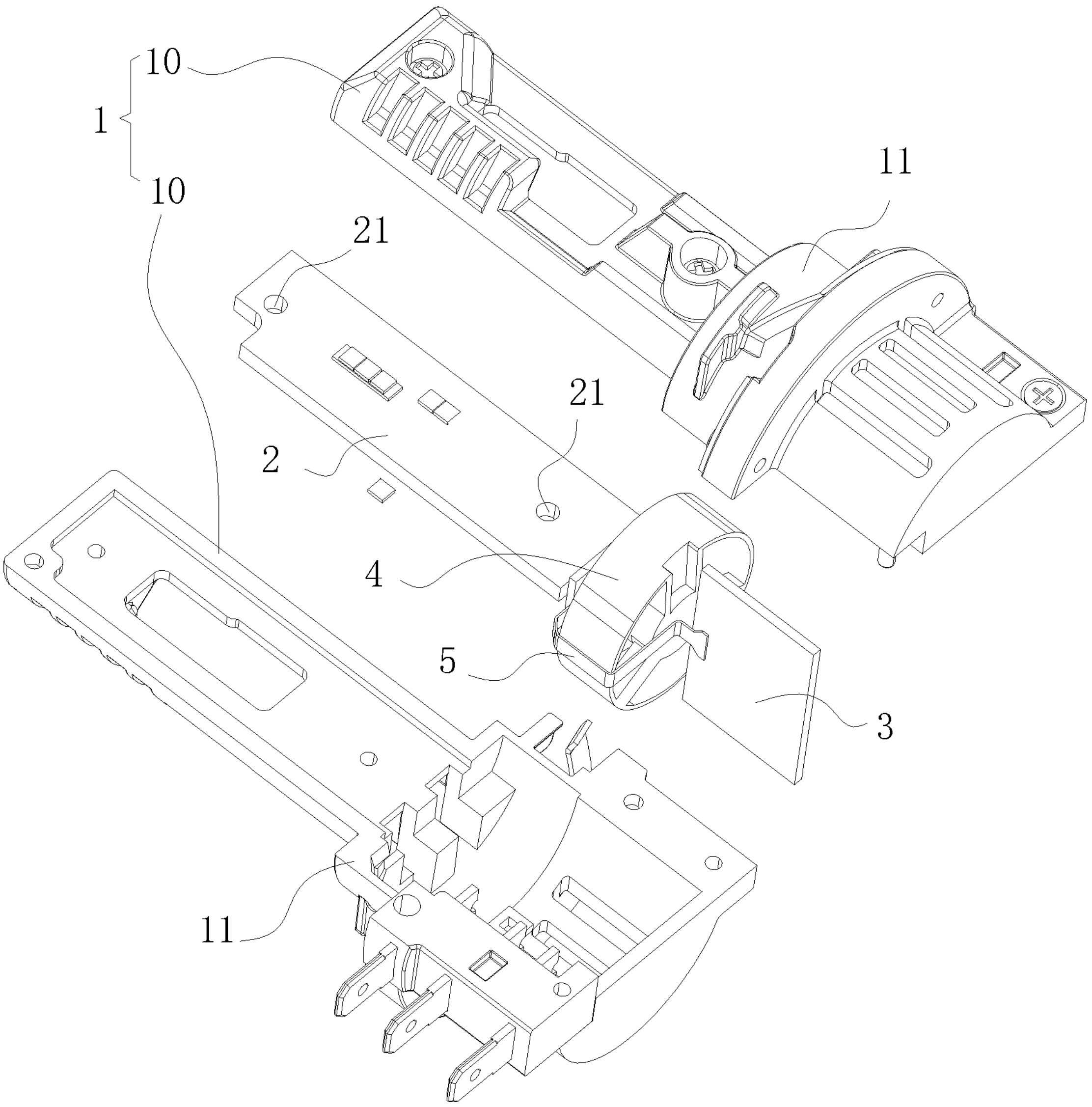
FIG. 2 is an exploded view of Example 2 of an in-situ replaceable LED car headlight in the present invention.

Referring to FIG. 2, the difference between this example and Example 1 is that in this example, the overall size of the lamp body shell 1 is relatively large, a fan support frame is also provided outside the fan 4, and there is no need to provide a limit slot 12 in the central installation part 11.

Further, in this example, the heat dissipation fins are arranged at the head of the lamp body shell 1, and the heat dissipation holes are arranged at the tail of the lamp body shell 1.

Example 3

Figure 3:
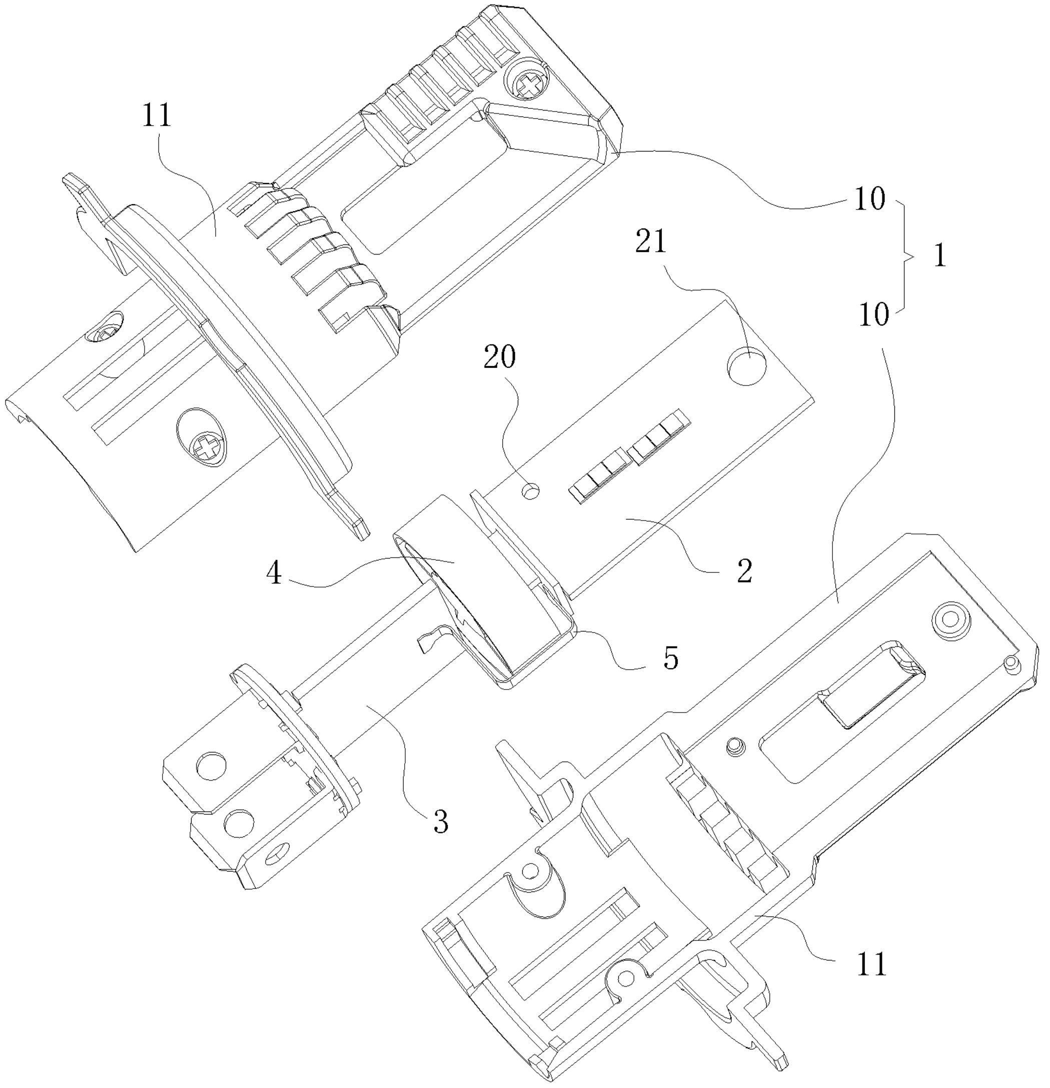
FIG. 3 is an exploded view of Example 3 of an in-situ replaceable LED car headlight in the present invention.

Referring to FIG. 3, the difference between this example and Example 1 is that in this example, the overall size of the lamp body shell 1 is relatively large, and a fan support frame is also arranged outside the fan 4, that is, the fan 4 adopts a circular frame structure fan, and there is no need to set a limit slot 12 in the central installation part 11. The light source assembly 2 is arranged in the parallel middle section inside the two half-shell assemblies 10, wherein one half-shell assembly 10 is provided with a limiting post 100, and the light source assembly 2 is provided with a limiting hole 20 adapted to the limiting post 100 and an installation hole 21, and the light source assembly 2 is connected and fixed with the lamp body shell 1 through a fastening bolt.

Further, in this embodiment, the heat dissipation fins are arranged at the central installation part 11 and the head of the lamp body shell 1, and the heat dissipation holes are arranged at the tail of the lamp body shell 1.

The above examples are intended to illustrate the present invention, not to limit the present invention, and any solution after simple transformation of the present invention shall fall within the protection scope of the present invention.

What is claimed is:

1. An in-situ replaceable LED car headlight, comprising a lamp body shell, a light source assembly provided with LED lamps, a driving assembly, and a fan, wherein the light source assembly is arranged at a head of the lamp body shell, and the driving assembly is arranged at a tail of the lamp body shell; a middle part of the lamp body shell is provided with a central installation part for accommodating the fan, and the fan is installed between the light source assembly and the driving assembly;

wherein the driving assembly is electrically connected with the light source assembly by a flexible board connecting wire; the flexible board connecting wire is provided with a yielding bend, and the yielding bend spans the fan; and connecting parts, of the flexible board connecting wire, located at both sides of the yielding bend are electrically connected with the driving assembly and the light source assembly, respectively.

2. The in-situ replaceable LED car headlight according to claim 1, wherein the central installation part of the lamp body shell is also provided with a limit slot for accommodating the flexible board connecting wire.

3. The in-situ replaceable LED car headlight according to claim 1, wherein the flexible board connecting wire is an FPC connecting wire.

4. The in-situ replaceable LED car headlight according to claim 1, wherein an axis of the fan coincides with an axis of the lamp body shell.

5. The in-situ replaceable LED car headlight according to claim 1, wherein a fan support frame is also arranged outside the fan.

6. A design method of an in-situ replaceable LED car headlight, comprising the following steps:

S1, arranging a fan in a lamp body shell, the fan being located between a driving assembly and a light source assembly; and S2, electrically connecting the driving assembly with the light source assembly by a flexible board connecting wire;

wherein the flexible board connecting wire is provided with a yielding bend, and the yielding bend spans the fan; and connecting parts, of the flexible board connecting wire, located at both sides of the yielding bend are electrically connected with the driving assembly and the light source assembly, respectively.

7. The design method of an in-situ replaceable LED car headlight according to claim 6, wherein the flexible board connecting wire is an FPC connecting wire.

8. The design method of an in-situ replaceable LED car headlight according to claim 6, wherein an axis of the fan coincides with an axis of the lamp body shell.

* * * * *